United States Patent
Numajiri et al.

(10) Patent No.: US 11,970,091 B2
(45) Date of Patent: Apr. 30, 2024

(54) VEHICLE SEAT

(71) Applicant: TS TECH CO., LTD., Asaka (JP)

(72) Inventors: Hiroyuki Numajiri, Tochigi (JP); Nobuyuki Tezuka, Tochigi (JP); Akihito Kobayashi, Tochigi (JP); Tadashi So, Tochigi (JP); Akira Miyoshi, Tochigi (JP); Tomoyuki Kurimoto, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 316 days.

(21) Appl. No.: 17/599,607

(22) PCT Filed: Mar. 25, 2020

(86) PCT No.: PCT/JP2020/013303
§ 371 (c)(1),
(2) Date: Sep. 29, 2021

(87) PCT Pub. No.: WO2020/203542
PCT Pub. Date: Oct. 8, 2020

(65) Prior Publication Data
US 2022/0161694 A1    May 26, 2022

Related U.S. Application Data

(60) Provisional application No. 62/826,216, filed on Mar. 29, 2019.

(51) Int. Cl.
*B60N 2/14*      (2006.01)
*B60N 2/06*      (2006.01)

(52) U.S. Cl.
CPC ........... *B60N 2/14* (2013.01); *B60N 2/06* (2013.01)

(58) Field of Classification Search
CPC .. B60N 2/14; B60N 2/06; B60N 2/067; B60N 2/02253
(Continued)

(56) References Cited

U.S. PATENT DOCUMENTS 872,247 A * 11/1907 Moss .................. B60N 2/0705
248/416
6,357,814 B1 * 3/2002 Boisset ................. B60N 2/206
296/65.13
(Continued)

FOREIGN PATENT DOCUMENTS

CN      101987584 A      3/2011
CN      206528375 U      9/2017
(Continued)

OTHER PUBLICATIONS

PCT International Search Report (w/ English translation) for corresponding PCT Application No. PCT/JP2020/013303, dated Jun. 9, 2020, 6 pages.

(Continued)

*Primary Examiner* — Dennis H Pedder
(74) *Attorney, Agent, or Firm* — Dority & Manning, P.A.

(57) ABSTRACT

To provide a vehicle seat in which the rotation device is disposed without compromising the passenger comfort in the cabin, a vehicle seat includes: a floor panel which has a sheet shape, constitutes a floor surface of a cabin, and has an elongated hole extending linearly; a slide device provided below the floor panel to be slidable along the elongated hole; a rotation device provided on the slide device to be rotatable about a rotation axis below the floor panel, the rotation axis extending vertically and overlapping with the elongated hole; a support leg which is columnar in shape, is provided on the rotation device along the rotation axis, and extends to above the floor panel by passing through the elongated hole; and a seat main body which is joined to an upper end of the support leg and on which an occupant can be seated.

15 Claims, 9 Drawing Sheets

(58) Field of Classification Search
USPC .................. 296/65.06, 7, 13–15; 297/344.11
See application file for complete search history.

(56) References Cited

U.S. PATENT DOCUMENTS

| | | |
|---|---|---|
| 8,348,326 B2 | 1/2013 | Koga |
| 2021/0194286 A1* | 6/2021 | Yamamoto ............... B60N 2/14 |

FOREIGN PATENT DOCUMENTS

| | | |
|---|---|---|
| CN | 107662525 A | 2/2018 |
| JP | S 61-169834 | 10/1986 |
| JP | H 09-2111 | 1/1997 |
| JP | 2002-234368 | 8/2002 |
| JP | 2005-059771 | 3/2005 |
| JP | 2010-070084 | 4/2010 |
| JP | 2015-080390 | 4/2015 |

OTHER PUBLICATIONS

Chinese Office Action (w/ English translation) for corresponding Application No. 202080025105.6, dated Mar. 27, 2024, 17 pages.

* cited by examiner

Fig.8
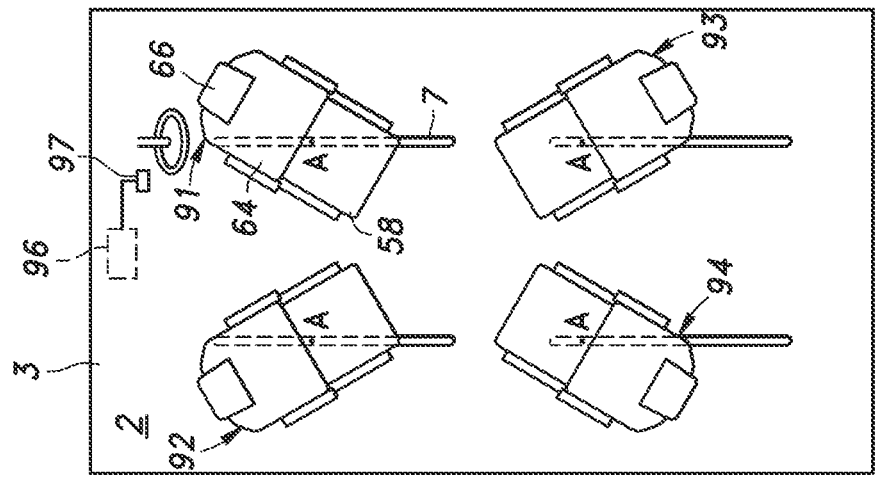
(C)
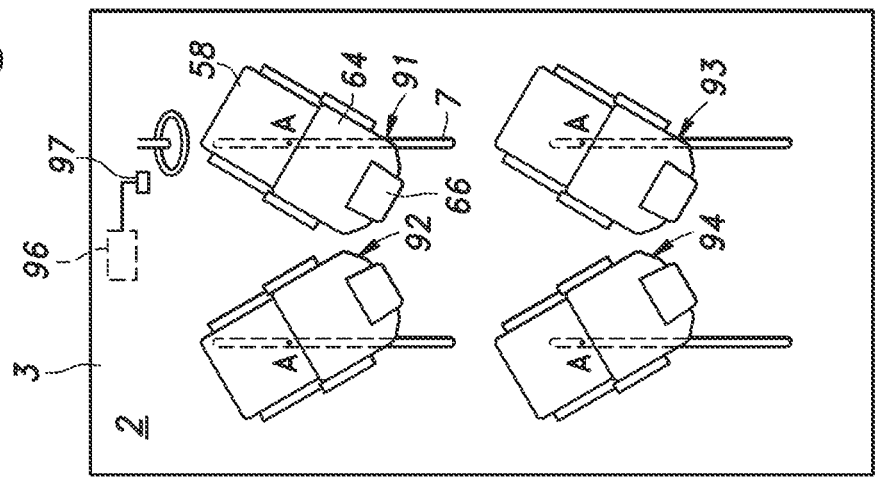
(B)
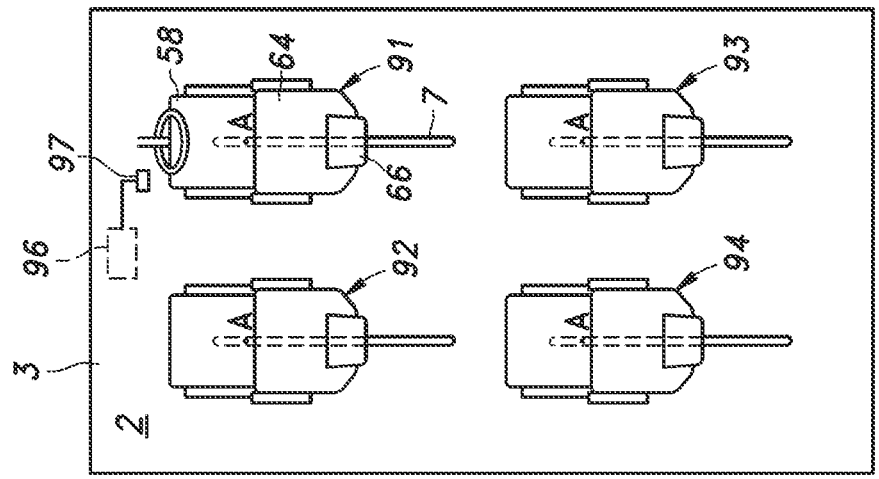
(A)

Fig. 9
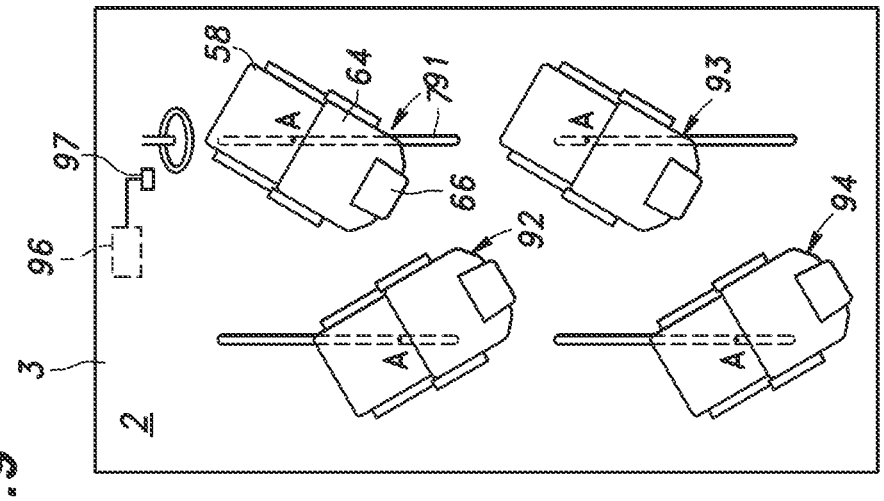
(D)
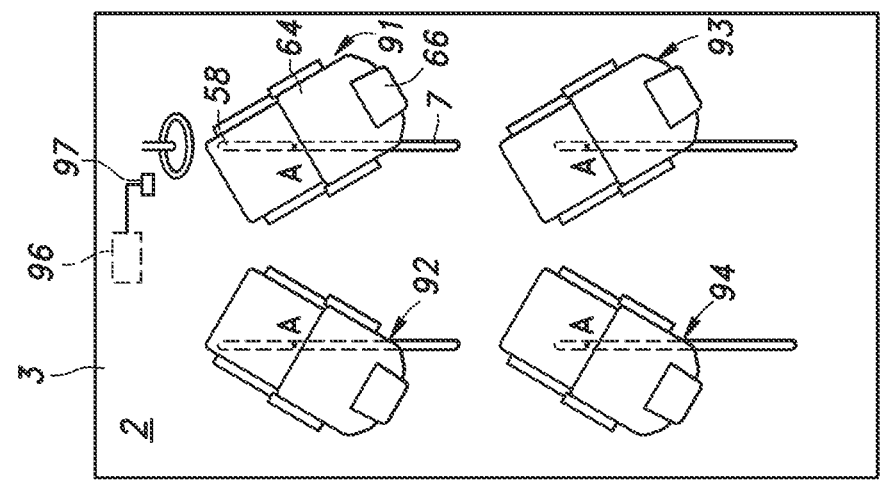
(E)

VEHICLE SEAT

CROSS REFERENCE TO RELATED APPLICATIONS

This application is the U.S. National Stage entry of International Application No. PCT/JP2020/013303 filed under the Patent Cooperation Treaty and having a filing date of Mar. 25, 2020, which claims priority to U.S. Provisional Patent Application No. 62/826,216 having a filing date of Mar. 29, 2019, both of which are incorporated herein by reference.

TECHNICAL FIELD

The present invention relates to a vehicle seat.

BACKGROUND ART

Patent Document 1 discloses a vehicle seat including outer rails disposed below the floor panel of a vehicle, inner rails disposed below the floor panel of the vehicle to be slidable relative to the outer rails, a seat leg joined to the inner rails and extending to above the floor panel by passing through a slit formed in the floor panel, and a seat main body joined to the upper end of the seat leg. The seat leg extends in the fore and aft direction along the inner rails. This vehicle seat can reduce the number of structural elements disposed between the floor panel and the seat main body, and thus can improve the passenger comfort in the cabin.

PRIOR ART DOCUMENT(S)

Patent Document(s)

[Patent Document 1] JPS61-169834U

SUMMARY OF THE INVENTION

Task to be Accomplished by the Invention

When the vehicle seat has a rotation device for causing the seat main body to rotate relative to the floor panel, how to dispose the rotation device is important not to compromise the passenger comfort in the cabin.

In view of the foregoing background, an object of the present invention is to provide a vehicle seat in which the rotation device is disposed without compromising the passenger comfort in the cabin.

Means to Accomplish the Task

To achieve the above object, one aspect of the present invention provides a vehicle seat (1), comprising: a floor panel (3) which has a sheet shape, constitutes a floor surface of a cabin, and has an elongated hole (7) extending linearly; a slide device (11) provided below the floor panel to be slidable along the elongated hole; a rotation device (12) provided on the slide device to be rotatable about a rotation axis (A) below the floor panel, the rotation axis extending vertically and overlapping with the elongated hole; a support leg (13) which is columnar in shape, is provided on the rotation device along the rotation axis, and extends to above the floor panel by passing through the elongated hole; and a seat main body (14) which is joined to an upper end of the support leg and on which an occupant can be seated.

According to this aspect, since the slide device and the rotation device are disposed below the floor, the number of structural elements disposed above the floor is reduced. Therefore, in the vehicle seat, the rotation device can be disposed without compromising the passenger comfort in the cabin. Also, since the support leg is columnar in shape, the width of the elongated hole can be reduced.

In the above aspect, preferably, the support leg is formed in a substantially hollow cylindrical shape or a substantially solid cylindrical shape.

According to this aspect, the width of the elongated hole can be reduced.

In the above aspect, preferably, the support leg has a diameter smaller than both a width of the seat main body in a fore and aft direction and a width of the seat main body in a lateral direction, and the upper end of the support leg is provided with a flange (51) joined to the seat main body and multiple upper ribs (52) protruding radially outward from the support leg and joined to the flange.

According to this aspect, the upper ribs improve the stiffness of the joint between the support leg and the flange.

In the above aspect, preferably, a lower end of the support leg is provided with multiple lower ribs (53) protruding radially outward and joined to the rotation device.

According to this aspect, the lower ribs improve the stiffness of the joint between the support leg and the rotation device.

In the above aspect, preferably, the support leg has a diameter smaller than both a width of the seat main body in a fore and aft direction and a width of the seat main body in a lateral direction, and a lower end of the support leg is provided with multiple lower ribs protruding radially outward and joined to the rotation device.

According to this aspect, the width of the support leg can be reduced, and thereby the width of the elongated hole can be reduced.

In the above aspect, preferably, the rotation device includes a lower member (21) joined to the slide device, an upper member (22) supported by the lower member to be rotatable about the rotation axis, and a rotation drive mechanism (23) for causing the upper member to rotate relative to the lower member, the lower end of the support leg and the lower ribs are joined to an upper surface of the upper member, the rotation drive mechanism includes a drive unit (42) for generating a driving force, and the drive unit is mounted on the upper surface of the upper member between two adjoining ones of the lower ribs.

According to this aspect, the drive unit can be disposed by using the space between the lower ribs.

In the above aspect, preferably, one of the lower member and the upper member has a support shaft (31) extending along the rotation axis, and another of the lower member and the upper member has a bearing hole (32) rotatably receiving the support shaft.

According to this aspect, the joint between the lower member and the upper member can be achieved as a simple configuration.

In the above aspect, preferably, the rotation drive mechanism includes an annular external tooth gear (43) joined to the upper surface of the lower member coaxially with the rotation axis and a pinion (44) rotatably supported on a lower surface of the upper member and meshing with the external tooth gear, and the pinion rotates by receiving the driving force of the drive unit.

According to this aspect, the driving device can have a simple and compact configuration.

In the above aspect, preferably, the multiple lower ribs extend radially from the support leg and are arranged at positions overlapping with the upper member as viewed from above.

According to this aspect, the lower ribs can enhance the stiffness of the joint between the support leg and the upper member.

In the above aspect, preferably, the slide device includes a pair of lower rails (16) extending in parallel with the elongated hole and a pair of upper rails (17) respectively supported on the lower rails, the lower member is joined to each of the pair of upper rails, and the external tooth gear is positioned between the pair of lower rails as viewed from above.

According to this aspect, the slide device can support the rotation device stably.

In the above aspect, preferably, the slide device includes a pair of lower rails (17) extending in parallel with the elongated hole and a pair of upper rails (17) respectively supported on the lower rails, the rotation device includes a lower member (21) joined to each of the pair of upper rails and an upper member (22) supported by the lower member to be rotatable about the rotation axis, and the support leg is positioned between the pair of lower rails as viewed from above.

According to this aspect, the slide device can support the support leg stably.

In the above aspect, preferably, the lower surface of the lower member is provided with multiple first reinforcement members (26) extending along the lower surface of the lower member in parallel with the lower rails and multiple second reinforcement members (27) extending along the lower surface of the lower member in a direction orthogonal to the lower rails and connecting the multiple first reinforcement members.

According to this aspect, the first reinforcement members and the second reinforcement members can suppress deformation of the lower member.

In the above aspect, preferably, the multiple first reinforcement members are arranged between the pair of upper rails.

According to this aspect, it is possible to suppress deformation of a part of the lower member positioned between the pair of upper rails.

In the above aspect, preferably, the vehicle seat further comprises a slide drive unit (18B) that connects the pair of upper rails and generates a driving force in each of the upper rails relative to the lower rails, and the slide drive mechanism is positioned lower than the first reinforcement members and the second reinforcement member.

According to this aspect, when the upper rails move relative to the lower rails, it is possible to prevent the slide drive unit from interfering with the first reinforcement members and the second reinforcement members.

In the above aspect, preferably, the seat main body has: a seat cushion (58) including a seat cushion frame (55) joined to the support leg, a seat cushion pad (56) supported by the seat cushion frame, and a seat cushion skin member (57) covering the seat cushion pad; a seat back (64) including a seat back frame (61) joined to the seat cushion frame, a seat back pad (62) supported by the seat back frame, and a seat back skin member (63) covering the seat back pad; and a headrest (66) joined to the seat back.

Effect of the Invention

One aspect of the present invention provides a vehicle seat (1), comprising: a floor panel (3) which has a sheet shape, constitutes a floor surface of a cabin, and has an elongated hole (7) extending linearly; a slide device (11) provided below the floor panel to be slidable along the elongated hole, a rotation device (12) provided on the slide device to be rotatable about a rotation axis (A) below the floor panel, the rotation axis extending vertically and overlapping with the elongated hole; a support leg (13) which is columnar in shape, is provided on the rotation device along the rotation axis, and extends to above the floor panel by passing through the elongated hole; and a seat main body (14) which is joined to an upper end of the support leg and on which an occupant can be seated. According to this aspect, since the slide device and the rotation device are disposed below the floor, the number of structural elements disposed above the floor is reduced. Therefore, in the vehicle seat, the rotation device can be disposed without compromising the passenger comfort in the cabin. Also, since the support leg is columnar in shape, the width of the elongated hole can be reduced.

In the above aspect, preferably, the support leg is formed in a substantially hollow cylindrical shape or a substantially solid cylindrical shape. According to this aspect, the width of the elongated hole can be reduced.

In the above aspect, preferably, the support leg has a diameter smaller than both a width of the seat main body in a fore and aft direction and a width of the seat main body in a lateral direction, and the upper end of the support leg is provided with a flange (51) joined to the seat main body and multiple upper ribs (52) protruding radially outward from the support leg and joined to the flange. According to this aspect, the upper ribs improve the stiffness of the joint between the support leg and the flange.

In the above aspect, preferably, a lower end of the support leg is provided with multiple lower ribs (53) protruding radially outward and joined to the rotation device. According to this aspect, the lower ribs improve the stiffness of the joint between the support leg and the rotation device.

In the above aspect, preferably, the support leg has a diameter smaller than both a width of the seat main body in a fore and aft direction and a width of the seat main body in a lateral direction, and a lower end of the support leg is provided with multiple lower ribs protruding radially outward and joined to the rotation device. According to this aspect, the width of the support leg can be reduced, and thereby the width of the elongated hole can be reduced.

In the above aspect, preferably, the rotation device includes a lower member (21) joined to the slide device, an upper member (22) supported by the lower member to be rotatable about the rotation axis, and a rotation drive mechanism (23) for causing the upper member to rotate relative to the lower member, the lower end of the support leg and the lower ribs are joined to an upper surface of the upper member, the rotation drive mechanism includes a drive unit (42) for generating a driving force, and the drive unit is mounted on the upper surface of the upper member between two adjoining ones of the lower ribs. According to this aspect, the drive unit can be disposed by using the space between the lower ribs.

In the above aspect, preferably, one of the lower member and the upper member has a support shaft (31) extending along the rotation axis, and another of the lower member and the upper member has a bearing hole (32) rotatably receiving the support shaft. According to this aspect, the joint between the lower member and the upper member can be achieved as a simple configuration.

In the above aspect, preferably, the rotation drive mechanism includes an annular external tooth gear (43) joined to the upper surface of the lower member coaxially with the rotation axis and a pinion (44) rotatably supported on a lower surface of the upper member and meshing with the external tooth gear, and the pinion rotates by receiving the driving force of the drive unit. According to this aspect, the driving device can have a simple and compact configuration.

In the above aspect, preferably, the multiple lower ribs extend radially from the support leg and are arranged at positions overlapping with the upper member as viewed from above. According to this aspect, the lower ribs can enhance the stiffness of the joint between the support leg and the upper member.

In the above aspect, preferably, the slide device includes a pair of lower rails (16) extending in parallel with the elongated hole and a pair of upper rails (17) respectively supported on the lower rails, the lower member is joined to each of the pair of upper rails, and the external tooth gear is positioned between the pair of lower rails as viewed from above. According to this aspect, the slide device can support the rotation device stably.

In the above aspect, preferably, the slide device includes a pair of lower rails (17) extending in parallel with the elongated hole and a pair of upper rails (17) respectively supported on the lower rails, the rotation device includes a lower member (21) joined to each of the pair of upper rails and an upper member (22) supported by the lower member to be rotatable about the rotation axis, and the support leg is positioned between the pair of lower rails as viewed from above. According to this aspect, the slide device can support the support leg stably.

In the above aspect, preferably, the lower surface of the lower member is provided with multiple first reinforcement members (26) extending along the lower surface of the lower member in parallel with the lower rails and multiple second reinforcement members (27) extending along the lower surface of the lower member in a direction orthogonal to the lower rails and connecting the multiple first reinforcement members. According to this aspect, the first reinforcement members and the second reinforcement members can suppress deformation of the lower member.

In the above aspect, preferably, the multiple first reinforcement members are arranged between the pair of upper rails. According to this aspect, it is possible to suppress deformation of a part of the lower member positioned between the pair of upper rails.

In the above aspect, preferably, the vehicle seat further comprises a slide drive unit (18B) that connects the pair of upper rails and generates a driving force in each of the upper rails relative to the lower rails, and the slide drive mechanism is positioned lower than the first reinforcement members and the second reinforcement member. According to this aspect, when the upper rails move relative to the lower rails, it is possible to prevent the slide drive unit from interfering with the first reinforcement members and the second reinforcement members.

In the above aspect, preferably, the seat main body has: a seat cushion (58) including a seat cushion frame (55) joined to the support leg, a seat cushion pad (56) supported by the seat cushion frame, and a seat cushion skin member (57) covering the seat cushion pad; a seat back (64) including a seat back frame (61) joined to the seat cushion frame, a seat back pad (62) supported by the seat back frame, and a seat back skin member (63) covering the seat back pad; and a headrest (66) joined to the seat back.

BRIEF DESCRIPTION OF THE DRAWINGS

FIG. 8 is a view showing seat arrangements: (A) an initial arrangement, (B) a boarding/alighting arrangement, and (C) a communication arrangement; and FIG. 9 is a view showing seat arrangements: (D) a soft communication arrangement and (E) a privacy arrangement.

MODE(S) FOR CARRYING OUT THE INVENTION

In the following, an embodiment of the present invention will be described with reference to the drawings. A vehicle seat is configured to be disposed in a cabin of a vehicle. In the following, a vehicle seat configured to be disposed in a cabin of an automobile will be described.

Figure 1:
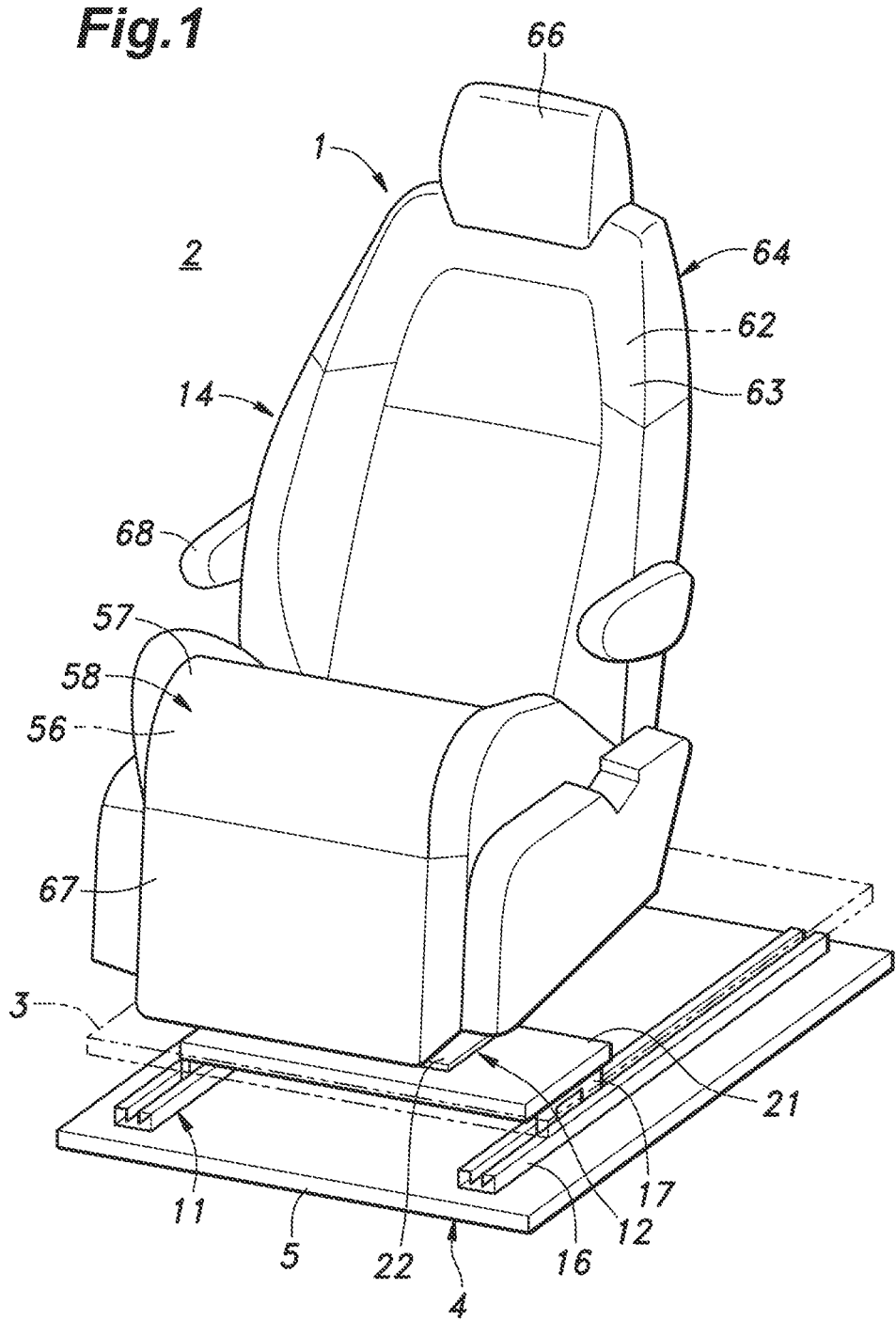
FIG. 1 is a perspective view of a seat according to an embodiment.

As shown in FIG. 1, a vehicle seat 1 is provided in a cabin 2 of an automobile. A floor surface of the cabin 2 of the automobile is constituted of a floor panel 3. The floor panel 3 is supported by a vehicle body frame 4 forming a skeleton of the automobile. The vehicle body frame 4 includes multiple longitudinal members extending in the fore and aft direction of the automobile and cross members extending in the lateral direction of the automobile and connecting the multiple longitudinal members to each other. The vehicle body frame 4 includes a lower member 5 disposed below the floor panel 3 with a gap from the floor panel 3. The lower member 5 may be configured as a part of the longitudinal members or the cross member. The lower member 5 is preferably formed in a sheet shape with surfaces facing up and down and defining a space from the floor panel 3.

Figure 2:
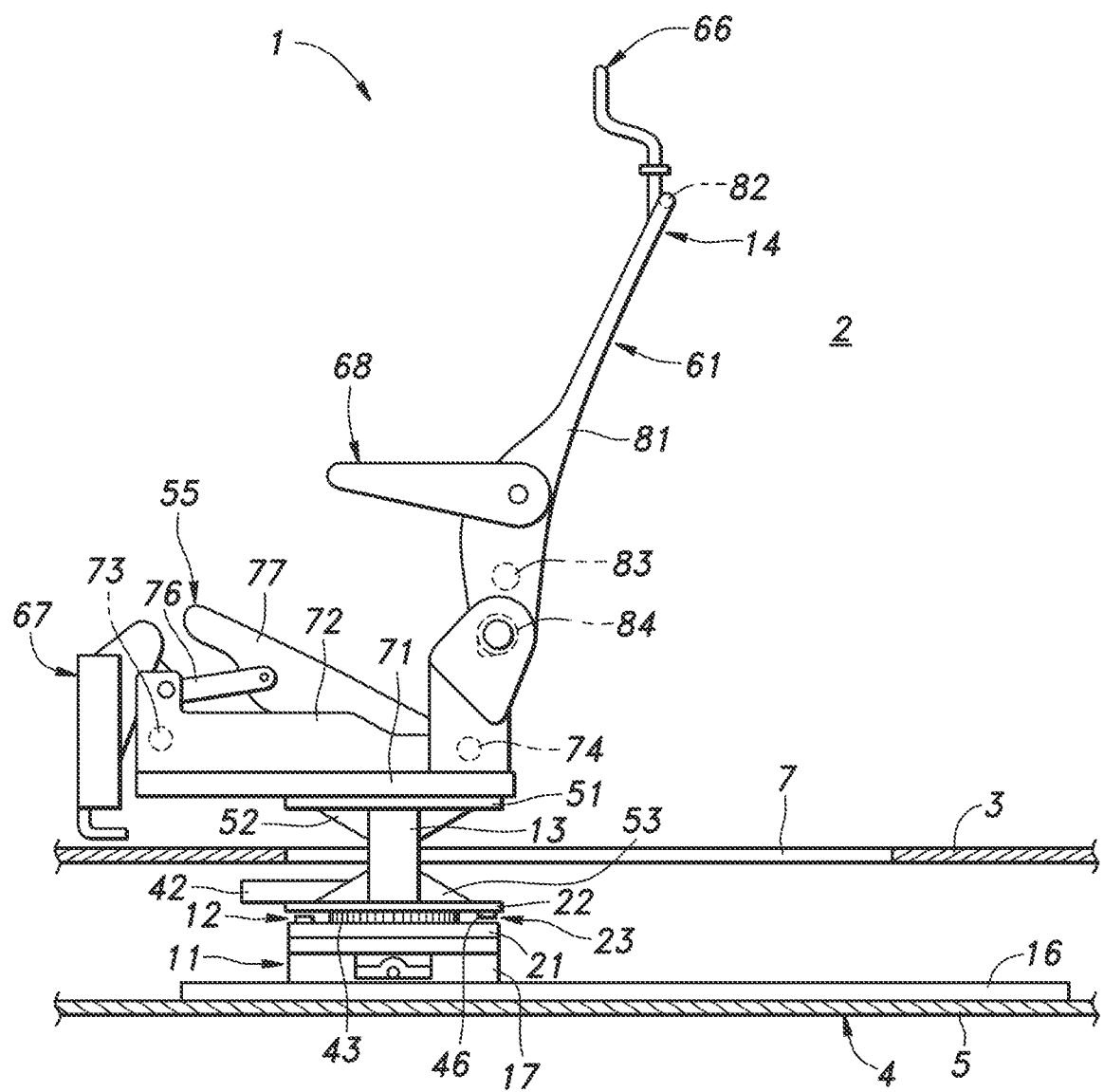
FIG. 2 is a side view showing a frame of the seat.

As shown in FIG. 2, the floor panel 3 is formed in a sheet shape with surfaces facing up and down. The floor panel 3 has an elongated hole 7 extending linearly. The elongated hole 7 penetrates vertically through the floor panel 3 and extends along the surfaces of the floor panel 3. In the present embodiment, the elongated hole 7 extends in the fore and aft direction of the automobile. In another embodiment, the elongated hole 7 may extend in the lateral direction of the automobile or in an oblique direction that is inclined relative to the fore and aft direction.

The seat 1 includes a slide device 11, a rotation device 12, a support leg 13, and a seat main body 14. The slide device 11 is provided below the floor panel 3 to be slidable along the elongated hole 7. The rotation device 12 is provided on the slide device 11 to be rotatable about a rotation axis A below the floor panel 3. The rotation device 12 is disposed such that the rotation axis A thereof extends vertically and overlaps with the elongated hole 7. The support leg 13 is columnar in shape, is provided on the rotation device 12 along the rotation axis A, and extends to above the floor panel 3 by passing through the elongated hole 7. The seat main body 14 is joined to the upper end of the support leg 13 and an occupant can be seated thereon.

The slide device 11 includes a pair of lower rails 16 and a pair of upper rails 17 respectively supported on the lower rails 16. Each lower rail 16 is attached to the lower member 5 and is disposed below the floor panel 3. Each lower rail 16 extends linearly in parallel with the elongated hole 7. In the present embodiment, each lower rail 16 extends in the fore and aft direction. As viewed from above, the elongated hole 7 is positioned between the pair of lower rails 16. The distance between the elongated hole 7 and each lower rail 16 is preferably the same.

Figure 3:
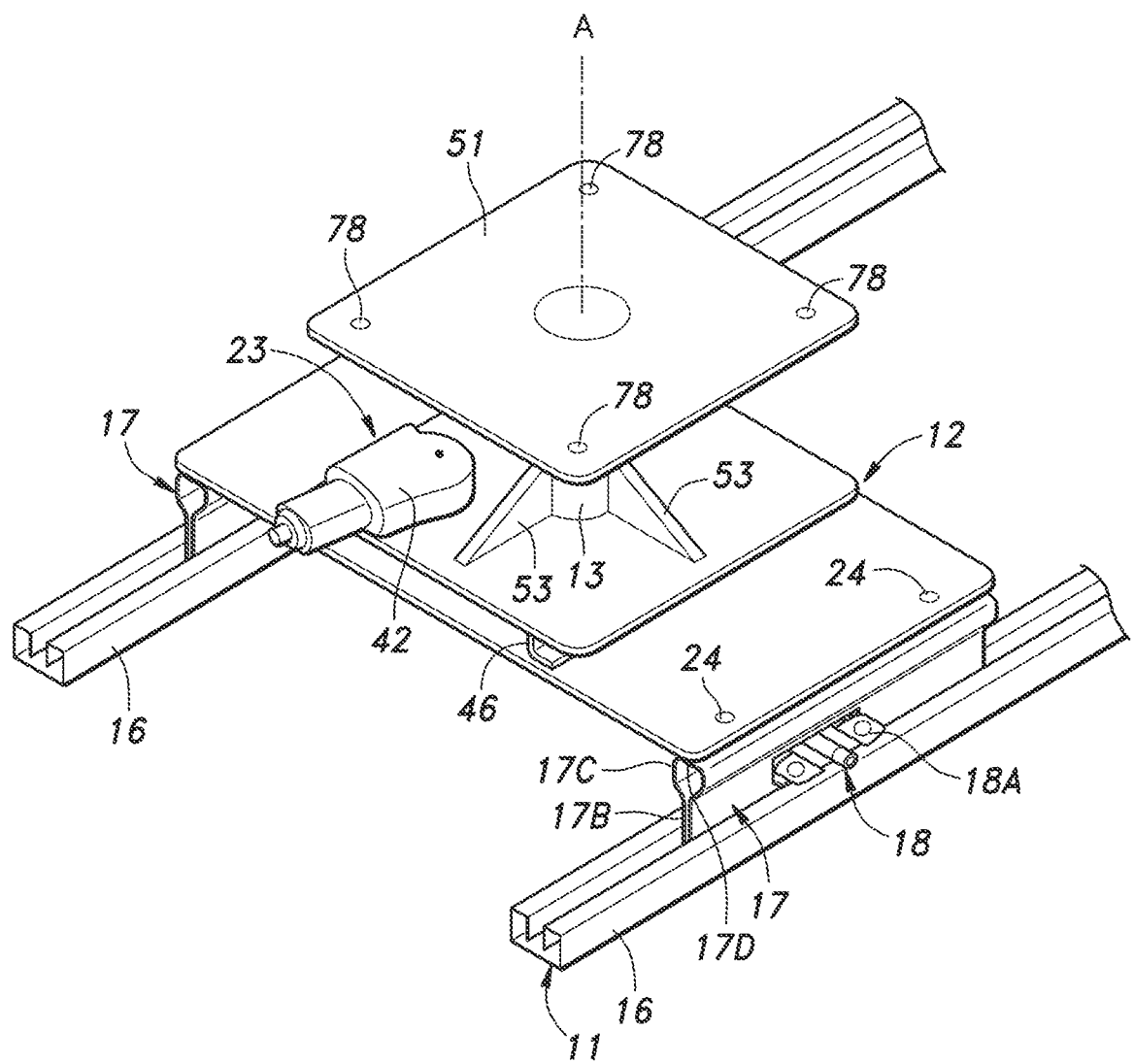
FIG. 3 is a perspective view of a slide device, a rotation device, and a support leg.
Figure 4:
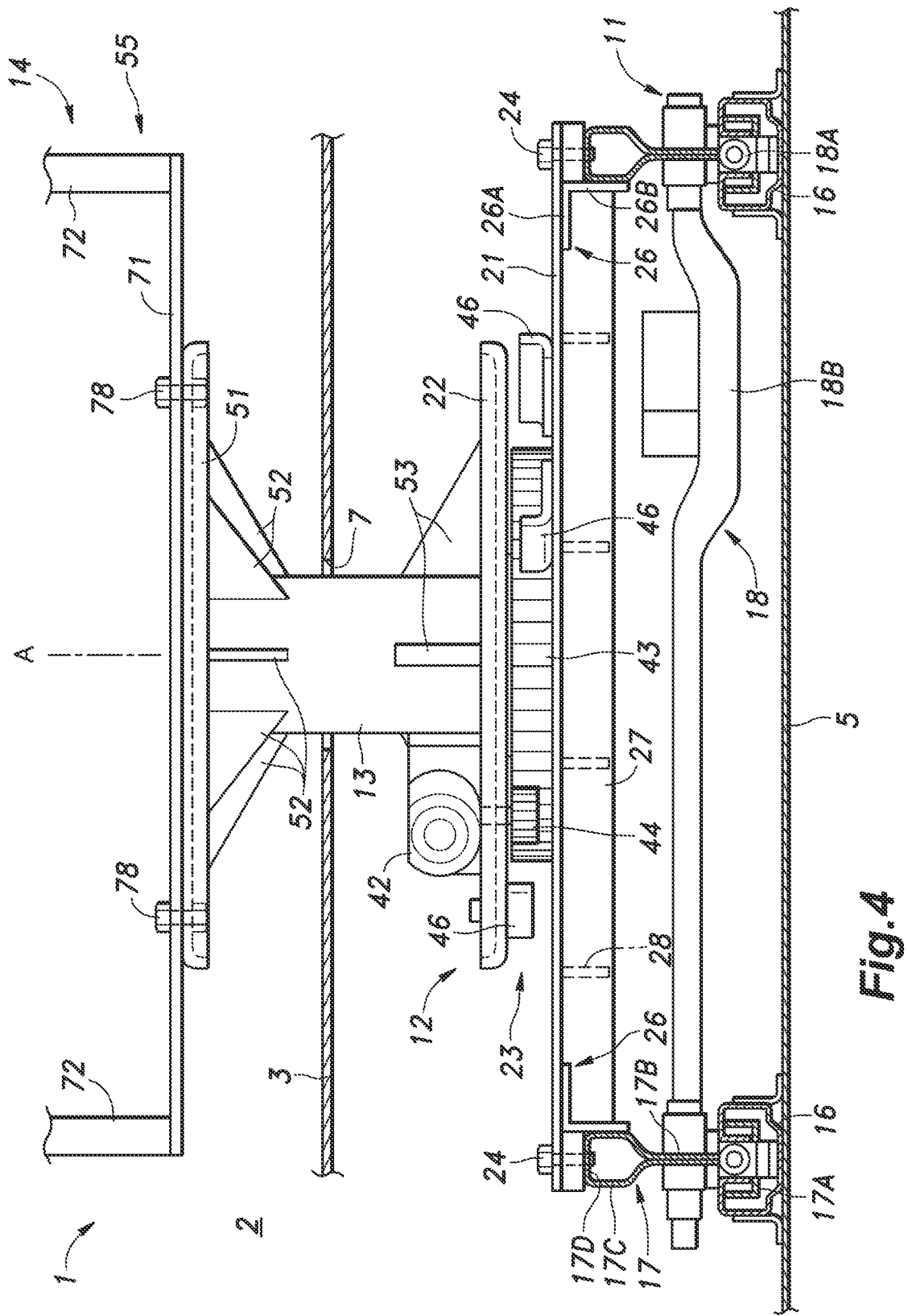
FIG. 4 is a front view of the slide device, the rotation device, and the support leg.

As shown in FIGS. 2 to 4, each upper rail 17 has an upper rail lower portion 17A received by the laterally corresponding lower rail 16 and an upper rail upper portion 17B protruding upward from the lower rail 16. The upper rail lower portion 17A is supported by the lower rail 16 to be slidable in the longitudinal direction of the lower rail 16.

The slide device 11 includes a slide drive mechanism 18 for slidingly moving the upper rails 17 relative to the lower rails 16. The slide drive mechanism 18 includes a gear mechanism 18A provided between the lower rails 16 and the upper rails 17 and a slide drive unit 18B for driving the gear mechanism 18A. The slide drive unit 18B includes a rotation drive unit 42, a driving force transmission mechanism for transmitting the driving force of the rotation drive unit 42 to the gear mechanism 18A, and a support member for supporting the rotation drive unit 42 and the driving force transmission mechanism. The gear mechanism 18A includes, for example, screw shafts disposed in the lower rails 16 and nuts rotatably supported by the upper rails 17 and threadably engaging with the screw shafts, respectively. The slide drive unit 18B transmits the rotational force of the rotation drive unit 42 to the nuts thereby to cause the nuts to rotate relative to the respective screw shafts. The support member of the slide drive unit 18B extends laterally and connects the left and right upper rail upper portions 17B to each other. The rotation drive unit 42 of the slide drive unit 18B is disposed between the left and right upper rail upper portions 17B. When the rotation drive unit 42 of the slide drive unit 18B rotates, the driving force transmission mechanism causes the nuts supported on the left and right upper rails 17 to simultaneously rotate, so that the nuts move relative to the screw shafts. Thereby, each upper rail 17 moves relative to each lower rail 16 in the longitudinal direction.

An upper end part of each upper rail upper portion 17B is provided with a tubular portion 17C having a closed cross section structure and extending in parallel with the extension direction of the lower rail 16. The tubular portion 17C is provided at an upper end thereof with an upper wall 17D having surfaces facing up and down.

The rotation device 12 includes a lower member 21 joined to the slide device 11, an upper member 22 supported by the lower member 21 to be rotatable about the rotation axis A, and a rotation drive mechanism 23 for causing the upper member 22 to rotate relative to the lower member 21. The lower member 21 is formed in a sheet shape with surfaces facing up and down. A left end portion of the lower member 21 is placed on the upper wall 17D of the left upper member and is joined to the upper portion. Similarly, a right end portion of the lower member 21 is placed on the upper wall 17D of the right upper member and is joined to the upper portion. In the present embodiment, each of the left end portion and the right end portion of the lower member 21 is fastened to the upper wall 17D at two fastening parts 24 respectively provided in a front portion and a rear portion thereof.

Figure 5:
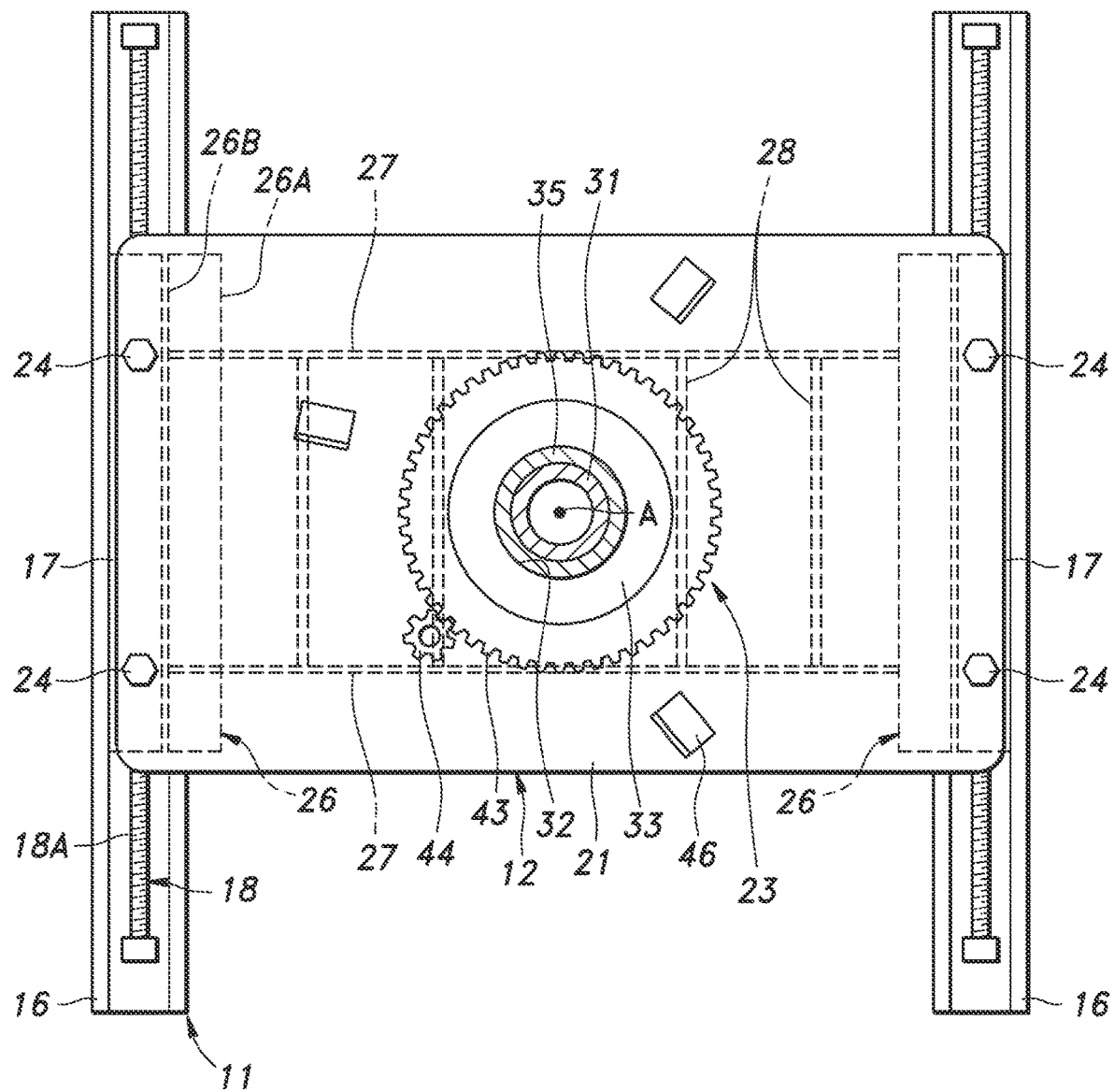
FIG. 5 is a plan view showing a lower half of the rotation device.

As shown in FIGS. 4 to 5, the lower surface of the lower member 21 is provided with multiple first reinforcement members 26 extending along the lower surface of the lower member 21 in parallel with the lower rails 16 and multiple second reinforcement members 27 extending along the lower surface of the lower member 21 in a direction orthogonal to the lower rails 16 and connecting the multiple first reinforcement members 26. Each first reinforcement member 26 is disposed between the pair of upper rails 17.

In the present embodiment, the first reinforcement members 26 are provided as a pair of left and right first reinforcement members 26, each extending along the tubular portion 17C of the upper member in the fore and aft direction. Each first reinforcement member 26 includes a sheet-shaped horizontal piece 26A extending along the lower surface of the lower member 21 in the fore and aft direction and a vertical piece 26B depending from a side edge of the horizontal piece 26A and extending in the fore and aft direction. The horizontal piece 26A and the vertical piece 26B are arranged to be perpendicular to each other to form an L shape. The horizontal piece 26A is joined to the lower surface of the lower member 21 and the vertical piece 26B is joined to the tubular portion 17C of the laterally corresponding upper rail 17.

In the present embodiment, the second reinforcement members 27 are provided as a pair of front and right second reinforcement members 27, each extending in the lateral direction. The left and right end portions of each second reinforcement member 27 are joined to the corresponding first reinforcement members 26. The front second reinforcement member 27 is disposed at the same position with respect to the fore and aft direction as the front fastening parts 24 for fastening the upper rails 17 to the lower member 21. The rear second reinforcement member 27 is disposed at the same position with respect to the fore and aft direction as the rear fastening parts 24 for fastening the upper rails 17 to the lower member 21. Each second reinforcement member 27 is formed in a sheet shape with surfaces facing forward and rearward and is joined to the lower surface of the lower member 21 at the upper edge thereof. The front and rear second reinforcement members 27 may be connected with each other by multiple third reinforcement members 28 extending in the fore and aft direction. The front and rear second reinforcement members 27 and the multiple third reinforcement members 28 may preferably cooperate to form a ladder structure. Preferably, the multiple third reinforcement members 28 are each joined to the lower surface of the lower member 21. The slide drive mechanism 18 is positioned lower than the first reinforcement members 26 and the second reinforcement members 27.

Figure 6:
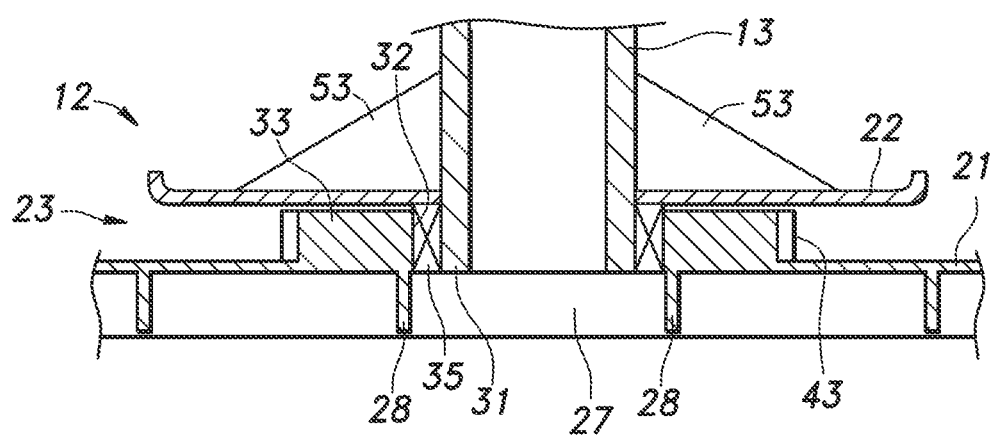
FIG. 6 is a sectional view of the rotation device.

One of the lower member 21 and the upper member 22 has a support shaft 31 extending along the rotation axis A, while the other of the lower member 21 and the upper member 22 has a bearing hole 32 for rotatably receiving the support shaft 31. As shown in FIG. 6, in the present embodiment, the lower member 21 has the bearing hole 32, and the upper member 22 has the support shaft 31.

At a central part of the upper surface of the lower member 21, a cylindrical portion 33 that protrudes upward is provided. A bearing hole 32 opening upward is formed inside the cylindrical portion 33. At the center of the lower surface of the upper member 22, a support shaft 31 protruding downward is provided. The support shaft 31 is inserted into the bearing hole 32 to be rotatably supported by the bearing hole 32. The axis of the bearing hole 32 and the support shaft 31 extends vertically to form the rotation axis A of the rotation device 12. Preferably, the support shaft 31 is supported by the bearing hole 32 via a radial bearing 35. The radial bearing 35 may be a known angular contact ball bearing or a known deep groove ball bearing, for example. The support shaft 31 may be a hollow cylinder. Between the upper end of the cylindrical portion 33 and the lower surface of the upper member 22, a thrust bearing may be preferably provided.

The lower end of the bearing hole 32 may penetrate through the lower member 21 to be opened downward. The cylindrical portion 33 may penetrate through the lower member 21 and extend to below the lower member 21. By increasing the lengths of the bearing hole 32 formed inside the cylindrical portion 33 and the support shaft 31, it is possible to suppress tilting of the support shaft 31 relative to the cylindrical portion 33. Between the cylindrical portion 33 and the support shaft 31, a removal prevention mechanism (not shown in the drawings) for preventing inadvertent removal of the support shaft 31 from the bearing hole 32 is provided. The removal prevention mechanism may be a known mechanism, such as a snap ring, for example. Also, the lower end of the support shaft 31 may protrude to below the bearing hole 32 and a retaining member larger than the diameter of the bearing hole 32 may be joined to the lower end of the support shaft 31.

As shown in FIGS. 4 and 5, the rotation drive mechanism 23 includes a gear mechanism 41 connecting the lower member 21 and the upper member 22 and a rotation drive unit 42 for driving the gear mechanism 41. The rotation drive unit 42 includes an electric motor and a drive transmission mechanism for decelerating and transmitting the rotation of the electric motor. The gear mechanism 41 receives the driving force from the rotation drive unit 42 and causes the upper member 22 to rotate relative to the lower member 21 about the rotation axis A. The gear mechanism 41 includes an external tooth gear 43 joined to one of the lower member 21 and the upper member 22 coaxially with the rotation axis A and a pinion 44 rotatably supported by the other of the lower member 21 and the upper member 22 and meshing with the external tooth gear 43. The pinion 44 receives the driving force of the rotation drive unit 42 and rotates. The rotation of the rotation drive unit 42 causes the pinion 44 to rotate, and the pinion 44 moves in the circumferential direction of the external tooth gear 43. Thereby, the upper member 22 rotates relative to the lower member 21 about the rotation axis A.

In the present embodiment, the external tooth gear 43 is provided on the lower member 21, and the pinion 44 is provided on the upper member 22. The external tooth gear 43 is provided on the upper surface of the lower member 21. Also, the external tooth gear 43 may preferably be provided on the outer circumferential surface of the cylindrical portion 33 and be joined to the upper surface of the lower member 21 on the lower end surface thereof. As viewed from above, the external tooth gear 43 is positioned between the pair of lower rails 16. The pinion 44 is provided on the lower surface of the upper member 22 in parallel with the rotation axis A. The shaft of the pinion 44 penetrates through the upper member 22 and extends to above the upper member 22. The rotation drive unit 42 is provided on the upper surface of the upper member 22 and is connected with the shaft of the pinion 44.

The upper surface of the lower member 21 and the lower surface of the upper member 22 have respective stoppers 46 joined thereto. The stoppers 46 define the rotatable range of the upper member 22 relative to the lower member 21 by coming into contact with each other in the circumferential direction with respect to the rotation axis A.

The lower end of the support leg 13 is joined to the upper surface of the upper member 22. The support leg 13 is formed in a substantially hollow cylindrical shape or a substantially solid cylindrical shape. The support leg 13 is disposed coaxially with the rotation axis A and extends vertically. A sheet-shaped flange 51 is provided at the upper end of the support leg 13. The flange 51 is orthogonal to the support leg 13 and is disposed in parallel with the upper member 22 with a gap defined between them. The flange 51 may be preferably formed in a rectangular shape, for example. The support leg 13 is joined to the center of the flange 51. The flange 51 is joined to the bottom portion of the seat main body 14. The diameter of the support leg 13 is set to be smaller than both the width of the flange 51 in the fore and aft direction and the width of the flange 51 in the lateral direction.

As shown in FIG. 4, the upper end of the support leg 13 is provided with multiple upper ribs 52 that protrude radially outward and are joined to the lower surface of the flange 51. The lower end of the support leg 13 is provided with multiple lower ribs 53 that protrude radially outward and are joined to the upper surface of the upper member 22 of the rotation device 12. Each of the upper ribs 52 and the lower ribs 53 is formed of a plate piece and extends radially with the rotation axis A being the center. The upper ribs 52 increase the stiffness of the joint between the support leg 13 and the flange 51. Namely, the upper ribs 52 suppress tilting of the flange 51 relative to the support leg 13. The lower ribs 53 increase the stiffness of the joint between the support leg 13 and the upper member 22. Namely, the upper ribs 52 suppress tilting of the flange 51 relative to the support leg 13.

The upper ribs 52 are preferably arranged in the circumferential direction of the support leg 13 at an interval of 45 degrees or 90 degrees, for example. Similarly, the lower ribs 53 are preferably arranged in the circumferential direction of the support leg 13 at an interval of 45 degrees or 90 degrees, for example. Each of the upper ribs 52 and the lower ribs 53 is preferably formed in a triangular shape, for example. Each upper rib 52 is disposed at a position overlapping with the flange 51 as viewed from above. Each lower rib 53 is disposed at a position overlapping with the upper member 22 as viewed from above. The lower end of each upper rib 52 is located higher than the upper end of each lower rib 53.

As shown in FIGS. 3 and 4, the rotation drive unit 42 is mounted on the upper surface of the upper member 22 between two adjoining lower ribs 53. Namely, the rotation drive unit 42 is disposed in a space formed between the two adjoining lower ribs 53.

As shown in FIG. 2, the support leg 13 passes through the elongated hole 7 of the floor panel 3 and extends vertically. The upper member 22, the rotation drive unit 42 and the multiple lower ribs 53 are positioned below the floor panel 3. The upper ribs 52 and the flange 51 are positioned above the floor panel 3.

The seat main body 14 has: a seat cushion 58 including a seat cushion frame 55 joined to the support leg 13, a seat cushion pad 56 supported by the seat cushion frame 55, and a seat cushion skin member 57 covering the seat cushion pad 56; a seat back 64 including a seat back frame 61 joined to the seat cushion frame 55, a seat back pad 62 supported by the seat back frame 61, and a seat back skin member 63 covering the seat back pad 6; and a headrest 66 joined to the seat back 64. Also, the seat main body 14 may have an ottoman 67 displaceably provided at the front end of the seat cushion 58 and an armrest 68 pivotably provided on the seat back 64.

Figure 7:
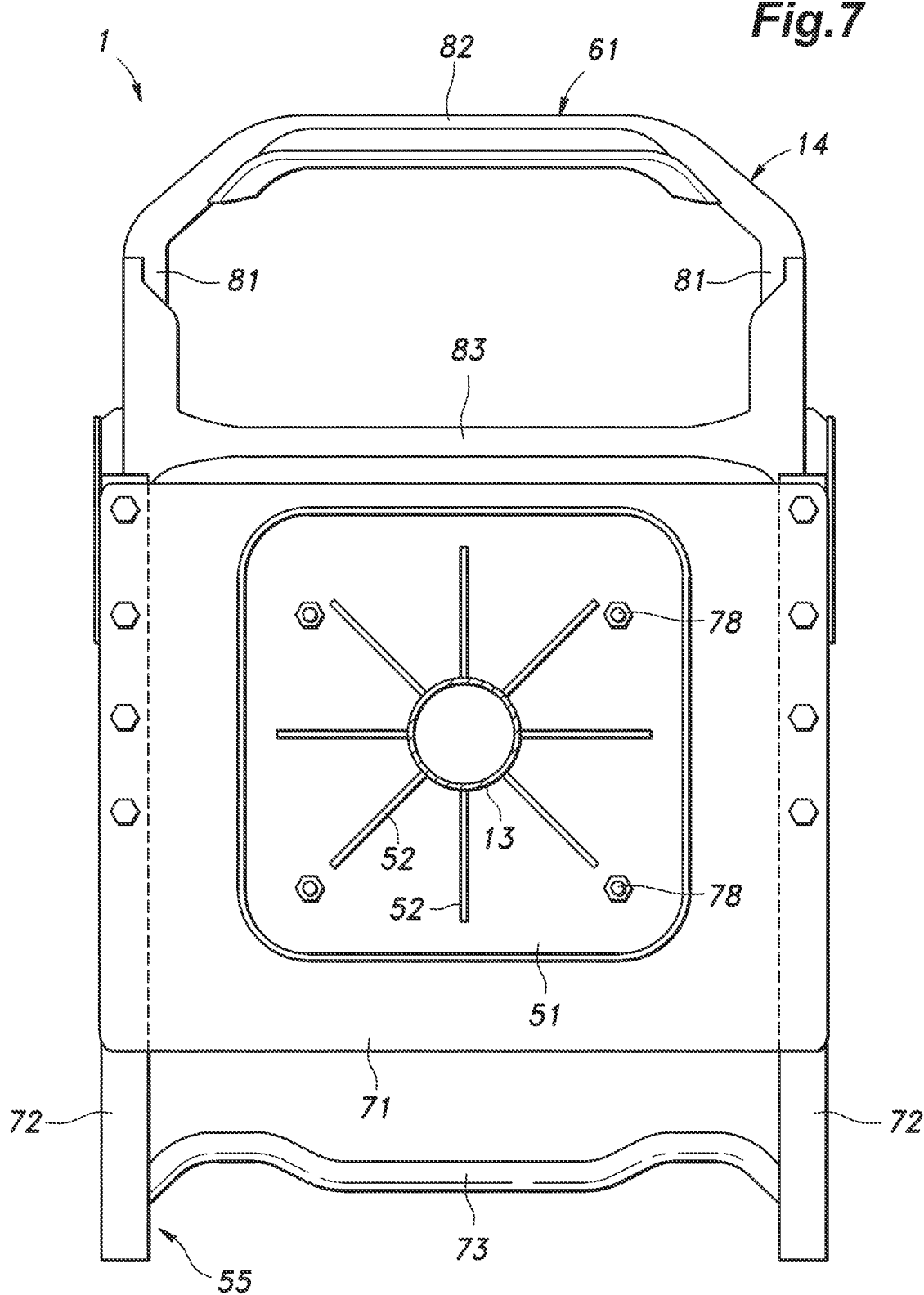
FIG. 7 is a view of the seat main body and an upper half of the support leg as viewed from below.

As shown in FIG. 2 and FIG. 7, the seat cushion frame 55 has a bottom plate 71 fastened to the upper surface of the flange 51, left and right cushion side members 72 joined to the upper surface of the bottom plate 71 and extending in the fore and aft direction, a front cross member 73 extending laterally and to have left and right end portions joined to the front ends of the respective side members, and a rear cross member 74 extending laterally to have left and right end portions joined to the rear ends of the respective side members. The seat cushion frame 55 may include a sub frame 77 supported by the left and right cushion side members 72 via a lifting mechanism 76. The bottom plate 71 is preferably fastened to the flange 51 at multiple fastening parts 78 by means of bolts and nuts. The fastening parts 78 between the bottom plate 71 and the flange 51 are preferably provided at positions corresponding to the corners of the rectangular flange 51, for example.

The seat back frame 61 has left and right back side members 81 that extend vertically, an upper cross member 82 extending laterally to have left and right end portions joined to the upper ends of the respective back side members 81, and a lower cross member 83 extending laterally below the upper cross member 82 to have left and right end portions joined to the lower portions of the respective back side members 81. The lower ends of the left and right back side members 81 are pivotably supported by the rear ends of the laterally corresponding cushion side members 72 via the reclining device 84.

The diameter of the support leg 13 is set to be smaller than both the width of the seat main body 14 in the fore and aft direction and the width of the seat main body 14 in the lateral direction.

In the seat 1, the slide device 11 and the rotation device 12 are positioned below the floor panel 3, while the support leg 13 passes through the elongated hole 7 and the seat main body 14 is positioned above the floor panel 3. Therefore, the seat 1 can be provided with the rotation device 12 while reducing the number of structural elements disposed above the floor panel 3 so that the passenger comfort in the cabin 2 is not compromised.

With the slide device 11, the seat main body 14 can move relative to the floor panel 3 in the extension direction of the lower rails 16. At this time, the support leg 13 moves within the elongated hole 7 in the extension direction of the elongated hole 7. Also, with the rotation device 12, the seat main body 14 can rotate relative to the floor panel 3 about the rotation axis A. At this time, the support leg 13 rotates within the elongated hole 7 about the rotation axis A. Thus, when the seat main body 14 slidingly moves or rotates, the support leg 13 is displaced within the elongated hole 7, and therefore, the support leg 13 does not interfere with the floor panel 3. Also, since the support leg 13 is columnar in shape, it is possible to reduce the width of the elongated hole 7.

Since the slide device 11 and the rotation device 12 are disposed below the floor panel 3, the number of structural elements disposed above the floor panel 3 can be reduced. Thereby, in the seat 1, the rotation device 12 can be disposed without compromising the passenger comfort in the cabin 2.

Multiple seats 1, each configured as described above, may be provided in the cabin 2 of the automobile. In the following, description will be made of an example in which a right front seat 91, a left front seat 92, a right rear seat 93, and a left rear seat 94 are provided in the cabin 2. Each of the seats 91 to 94 has a configuration same as that of the seat 1 described above. The floor panel 3 constituting the bottom portion of the cabin 2 is formed in a substantially rectangular shape and extends in the fore and aft direction. The right front seat 91 is provided on the right side of the front portion of the floor panel 3, the left front seat 92 is provided on the left side of the front portion of the floor panel 3, the right rear seat 93 is provided on the right side of the rear portion of the floor panel 3, and the left rear seat 94 is provided on the left side of the rear portion of the floor panel 3.

In each of the seats 91 to 94, the elongated hole 7 and the lower rails 16 extend in the fore and aft direction of the vehicle. Thereby, the seat main body 14 of each of the seats 91 to 94 can slidingly move in the fore and aft direction of the vehicle and can rotate about the rotation axis A which is movable in the fore and aft direction. In another embodiment, in each of the seats 91 to 94, the elongated hole 7 and the lower rails 16 may extend in an arbitrary direction and may extend in different directions from one seat to another.

The arrangements of the seats 91 to 94 may include, for example, an initial arrangement in which each seat main body 14 faces forward (see FIG. 8(A)), a boarding/alighting arrangement in which each seat main body 14 faces obliquely in a forward and laterally outboard direction (see FIG. 8(B)), a communication arrangement in which each seat main body 14 faces toward the center of the cabin 2 (see FIG. 8(C)), a soft communication arrangement in which each of the seats 91 to 94 faces obliquely in a forward and laterally inboard direction (see FIG. 9(D)), a privacy arrangement in which each seat main body 14 faces obliquely in a forward and laterally outboard direction and the seats are mutually offset in the fore and aft direction (see FIG. 9(E)), and so on. Also, an arrangement of the seats 91 to 94 in which the above arrangements are partially combined may be possible.

The position and orientation of each of the seats 91 to 94 is preferably controlled by a control device 96. The control device 96 is connected to the slide drive unit 18B of the slide device 11 and the rotation drive unit 42 of the rotation device 12 of each of the seats 91 to 94 as well as to an operation switch 97 operated by an occupant. The control device 96 preferably controls the slide drive unit 18B and the rotation drive unit 42 of each of the seats 91 to 94 to change the position and orientation of each seat main body 14 based on the signals from the operation switch 97. Also, the control device 96 may control the slide drive unit 18B and the rotation drive unit 42 of each seat to individually change the position and orientation of a particular seat main body 14 based on the signals from the operation switch 97.

Concrete embodiments have been described in the foregoing, but the present invention is not limited to the above embodiments and may be modified or altered in various ways. For example, the flange 51 and the bottom plate 71 may be formed integrally. Namely, the bottom plate 71 may be omitted and the flange 51 may constitute the bottom portion of the seat main body 14. In this case, the cushion side members 72 may be joined to the flange 51.

LIST OF REFERENCE NUMERALS 1 seat
2 cabin
3 floor panel
4 vehicle body frame
5 lower member
7 elongated hole
11 slide device
12 rotation device
13 support leg
14 seat main body
16 lower rail
17 upper rail
18 slide drive mechanism
18B the slide drive unit
21 lower member 22 upper member
23 rotation drive mechanism
24 fastening part
26 first reinforcement member
27 second reinforcement member
28 third reinforcement member
41 gear mechanism
42 rotation the drive unit
43 external tooth gear
44 pinion
51 flange
52 upper rib
53 lower rib
55 seat cushion frame
56 seat cushion pad
57 seat cushion the skin member
58 seat cushion
61 seat back frame
62 seat back pad
63 seat back the skin member
64 seat back
66 headrest
78 fastening part
A rotation axis

The invention claimed is:

1. A vehicle seat, comprising:
a floor panel which has a sheet shape, constitutes a floor surface of a cabin, and has an elongated hole extending linearly;
a slide device provided below the floor panel to be slidable along the elongated hole;
a rotation device provided on the slide device to be rotatable about a rotation axis below the floor panel, the rotation axis extending vertically and overlapping with the elongated hole;
a support leg which is columnar in shape, is provided on the rotation device along the rotation axis, and extends to above the floor panel by passing through the elongated hole; and
a seat main body which is joined to an upper end of the support leg and on which an occupant can be seated.

2. The vehicle seat according to claim 1, wherein the support leg is formed in a substantially hollow cylindrical shape or a substantially solid cylindrical shape.

3. The vehicle seat according to claim 2, wherein the support leg has a diameter smaller than both a width of the seat main body in a fore and aft direction and a width of the seat main body in a lateral direction, and
the upper end of the support leg is provided with a flange joined to the seat main body and multiple upper ribs protruding radially outward from the support leg and joined to the flange.

4. The vehicle seat according to claim 3, wherein a lower end of the support leg is provided with multiple lower ribs protruding radially outward and joined to the rotation device.

5. The vehicle seat according to claim 2, wherein the support leg has a diameter smaller than both a width of the seat main body in a fore and aft direction and a width of the seat main body in a lateral direction, and
a lower end of the support leg is provided with multiple lower ribs protruding radially outward and joined to the rotation device.

6. The vehicle seat according to claim 4, wherein the rotation device includes a lower member joined to the slide device, an upper member supported by the lower member to be rotatable about the rotation axis, and a rotation drive mechanism for causing the upper member to rotate relative to the lower member,
the lower end of the support leg and the lower ribs are joined to an upper surface of the upper member,
the rotation drive mechanism includes a drive unit for generating a driving force, and
the drive unit is mounted on the upper surface of the upper member between two adjoining ones of the lower ribs.

7. The vehicle seat according to claim 6, wherein one of the lower member and the upper member has a support shaft extending along the rotation axis, and
another of the lower member and the upper member has a bearing hole rotatably receiving the support shaft.

8. The vehicle seat according to claim 7, wherein the rotation drive mechanism includes an annular external tooth gear joined to the upper surface of the lower member coaxially with the rotation axis and a pinion rotatably supported on a lower surface of the upper member and meshing with the external tooth gear, and
the pinion rotates by receiving the driving force of the drive unit.

9. The vehicle seat according to claim 6, wherein the multiple lower ribs extend radially from the support leg and are arranged at positions overlapping with the upper member as viewed from above.

10. The vehicle seat according to claim 8, wherein the slide device includes a pair of lower rails extending in parallel with the elongated hole and a pair of upper rails respectively supported on the lower rails,
the lower member is joined to each of the pair of upper rails, and
the external tooth gear is positioned between the pair of lower rails as viewed from above.

11. The vehicle seat according to claim 2, wherein the slide device includes a pair of lower rails extending in parallel with the elongated hole and a pair of upper rails respectively supported on the lower rails,
the rotation device includes a lower member joined to each of the pair of upper rails and an upper member supported by the lower member to be rotatable about the rotation axis, and
the support leg is positioned between the pair of lower rails as viewed from above.

12. The vehicle seat according to claim 11, wherein the lower surface of the lower member is provided with multiple first reinforcement members extending along the lower surface of the lower member in parallel with the lower rails and multiple second reinforcement members extending along the lower surface of the lower member in a direction orthogonal to the lower rails and connecting the multiple first reinforcement members.

13. The vehicle seat according to claim 12, wherein the multiple first reinforcement members are arranged between the pair of upper rails.

14. The vehicle seat according to claim 13, further comprising a slide drive unit that connects the pair of upper rails and generates a driving force in each of the upper rails relative to the lower rails,
wherein the slide drive unit is positioned lower than the first reinforcement members and the second reinforcement members.

15. The vehicle seat according to claim 14, wherein the seat main body has: a seat cushion including a seat cushion frame joined to the support leg, a seat cushion pad supported by the seat cushion frame, and a seat cushion skin member covering the seat cushion pad; a seat back including a seat back frame joined to the seat cushion frame, a seat back pad supported by the seat back frame, and a seat back skin member covering the seat back pad; and a headrest joined to the seat back.

* * * * *